:

US005690832A

United States Patent [19]

Tavlarides et al.

[11] Patent Number: 5,690,832
[45] Date of Patent: Nov. 25, 1997

[54] CHEMICALLY ACTIVE CERAMIC COMPOSITIONS WITH A PHOSPHO-ACID MOIETY

[75] Inventors: Lawrence L. Tavlarides, Fayetteville; Nandu Deorkar, Syracuse, both of N.Y.

[73] Assignee: Syracuse University, Syracuse, N.Y.

[21] Appl. No.: 788,217

[22] Filed: Jan. 27, 1997

Related U.S. Application Data

[62] Division of Ser. No. 313,019, Sep. 27, 1994, Pat. No. 5,612,275.
[51] Int. Cl.$^6$ .................. B01D 15/00; C02F 1/42
[52] U.S. Cl. .................. 210/661; 210/669; 210/670; 210/679; 210/688
[58] Field of Search .................. 210/688, 661, 210/669, 670, 679

[56] References Cited

U.S. PATENT DOCUMENTS

| | | | |
|---|---|---|---|
| 3,886,080 | 5/1975 | Schucker et al. | 252/176 |
| 4,377,555 | 3/1983 | Hancock et al. | 423/6 |
| 4,421,654 | 12/1983 | Plueddemann | 210/698 |
| 4,448,694 | 5/1984 | Plueddemann | 210/682 |
| 4,585,559 | 4/1986 | DeVoe et al. | 210/679 |
| 4,623,638 | 11/1986 | Hayatsu et al. | 502/401 |
| 4,752,398 | 6/1988 | Holbein et al. | 210/679 |
| 4,756,971 | 7/1988 | Virtanen et al. | 428/405 |
| 4,824,576 | 4/1989 | Sood et al. | 210/662 |
| 4,943,375 | 7/1990 | Bradshaw et al. | 210/674 |
| 4,952,321 | 8/1990 | Bradshaw et al. | 210/670 |
| 4,959,153 | 9/1990 | Bradshaw et al. | 210/670 |
| 4,968,434 | 11/1990 | Kaneko et al. | 210/682 |
| 4,975,379 | 12/1990 | Bradshaw et al. | 436/77 |
| 5,039,419 | 8/1991 | Bradshaw et al. | 210/502.1 |
| 5,078,978 | 1/1992 | Tarbet et al. | 423/22 |
| 5,120,443 | 6/1992 | Bruening et al. | 210/638 |
| 5,175,110 | 12/1992 | Bradshaw et al. | 436/77 |
| 5,190,660 | 3/1993 | Lindoy et al. | 210/670 |
| 5,190,661 | 3/1993 | Bruening et al. | 210/670 |
| 5,316,683 | 5/1994 | Haesebroek et al. | 210/688 |

OTHER PUBLICATIONS

Nakamura et al., 15 *J. Nucl. Sci. and Tech.*, 829–834 (1978).

*Primary Examiner*—Walter D. Griffin
*Assistant Examiner*—In Suk Bullock
*Attorney, Agent, or Firm*—Nixon, Hargrave, Devans & Doyle

[57] ABSTRACT

Novel composite materials useful for removing heavy metal ions from solutions, such as aqueous waste streams, comprise an inorganic ceramic support, such as silica gel, having terminal hydroxy groups, to the oxygen of which a ligand is covalently bonded through a silane coupling agent, the ligand being a phosphorous or thiophosphorous based acid moiety.

36 Claims, 6 Drawing Sheets

CHEMICALLY ACTIVE CERAMIC COMPOSITIONS WITH A PHOSPHO-ACID MOIETY

This is a divisional of U.S. application Ser. No. 08/313,019, filed Sep. 27, 1994, now U.S. Pat. No. 5,612,275.

This invention was made with Government support under Contract #R818630-01-1, awarded by the Environmental Protection Agency. The Government has certain right in the invention.

FIELD OF INVENTION

The present invention relates to novel chemically active ceramic compositions and to their preparation and use for removing metal ions from solutions, especially from aqueous waste streams.

BACKGROUND OF THE INVENTION

Many industries utilize heavy metals and/or rare earth metals in their manufacturing processes. Such use typically results in liquid (generally aqueous) waste streams that contain residues of the rare earth or heavy metals utilized in the given manufacturing process. For example, the waste streams resulting from electronics, electroplating, and photographic processes typically contain metal ions such as copper, nickel, zinc, chromium (III), chromium (VI), cadmium, aluminum, lead, antimony, silver and gold, amongst others in various aqueous solutions such as sulfates, chlorides, fluoroborates and cyanides. Because of the potential adverse effect of such substances on health and the environment, the removal of rare earth metals and heavy metal ions from aqueous waste streams is a problem of continuing significance.

For the purposes of the present invention, heavy metals will be defined generally as elements having atomic numbers greater than 20, as defined by the Periodic Chart of the Elements and are metallic at ambient conditions. Rare earth metals are defined as those heavy metals having atomic numbers 57 through 71 inclusive. Actinides are those heavy metals having atomic numbers greater than 89. For example, aluminum, arsenic, antimony, copper, nickel, zinc, chromium, cadmium, mercury, platinum, palladium and gold are all heavy metals typically found in the waste stream of common manufacturing processes. In addition, cesium and strontium (and other radioactive metals) are found in aqueous waste streams in the nuclear industry.

The conventional and predominant method of treatment of the waste streams described above is the precipitation of the metal ions in the form of hydroxides or carbonates. That method of removing heavy metals is largely undesirable because it results in a sludge that is difficult and/or expensive to remove and separate from the waste stream. Furthermore, the recovered sludge is typically deposited in a hazardous waste site, raising additional environmental concerns. Finally, it is difficult to separate the individual metal from the resultant sludge for recycling back into the manufacturing process. Other recovery methods include evaporation, reverse osmosis, ion exchange, electrolytic metal recovery, and solvent extraction. These methods, however, have varying levels of success and do not typically allow for the quick and inexpensive separation and removal of the individual metals from the waste streams.

Another common technique for the separation and recovery of rare earths is solvent extraction. However, the main difficulty in a solvent extraction recovery process arises from the low concentration at which these metal ions exist in the aqueous stream generated from hydrometallurgical processes. Also, the identical complexing behavior of all the rare earths due to their similar ionic sizes and chemistry limits the ability to separate out the individual rare earth metals from the sample collected in the solvent extraction process. See Nakamura, Tachimori and Sato, 15 *Journal of Nuclear Science and Technology*, 829–834 (1978).

A more recent method of removing metals from waste streams features using compositions which include chelating agents that are bound to inorganic carriers. Chelating agents, also known as multidentate ligands, are compounds which are capable of complexing with various metal ions in solution where one chelation molecule has the capacity to attach a metal ion at two or more positions. Those chelating agents are molecules which contain one or more of the same donor atom (e.g., "electron sufficient" atoms such as oxygen, nitrogen, sulfur etc.) or two or more different donor atoms through which coordinate and/or covalent bonds are formed between the metal ion and chelating agent. One such composition is disclosed in U.S. Pat. No. 3,886,080 to Schucker et al. ("Schucker"). Schucker discloses a composition in which a chelating agent has been rendered immobile or insoluble by chemically coupling a chelating agent, selected from a defined group of chelates, by bonding the chelating agent to a silane coupling agent using a diazo linkage. The silane coupling agent, in turn, is bonded to the inorganic carrier.

The compositions defined by Schucker have many disadvantages. Initially, the method of making the compositions disclosed by Schucker inherently limits the types of compounds that can be utilized in the composition. For example, the only chelating agents that can be used are those compounds having an unsaturated ring structure. Furthermore, because the chelate and the silane coupling agent are bound by a diazo linkage, it is obvious that only compounds capable of forming such a linkage can be used to produce the composition. Furthermore, the Schucker process for making the compositions is a five step process. The large number of steps required can result in decreased capacities (i.e., the amount of metal the composition is capable of chelating) due to the aggregate inefficiency of the chemical reactions utilized to produce a given composition. Lastly, the Schucker compositions are not capable of separating individual metals and, therefore, are not useful in metal recovery processes which seek to recycle individual metals back into the manufacturing process from which they came. Accordingly, there exists a need for more cost efficient processes for the separation and removal of heavy metal and/or rare earth metals from waste streams by producing compositions having a variety of chelating agents which are specific and selective toward desired metal ions.

SUMMARY OF THE INVENTION

The present invention relates to the preparation and use of chemically active ceramic compositions for separating heavy metal ions from solutions and especially from aqueous waste streams. More particularly, the present invention relates to various compositions that have very high capacities for chelating heavy and/or rare earth metals and can be readily designed to selectively remove individual metals. Furthermore, the present invention relates to methods of making and using those compositions.

One embodiment of the present invention comprises a composite material having the formula:

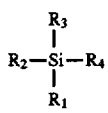

wherein at least one of $R_1$, $R_2$, and $R_3$ is SUPPORT—O— and $R_4$ is

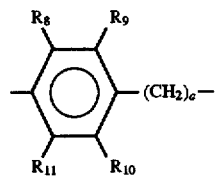

wherein X is S or O; $R_5$ is —$(CH_2)_a$—, where a is an integer of 1 to 5; or

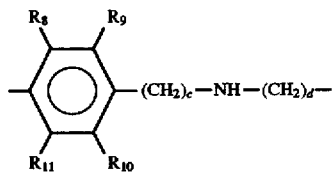

wherein $R_8$–$R_{11}$ are the same or different and are —H or —$(CH_2)_b CH_3$ where b is an integer from 0 to 20; or

or

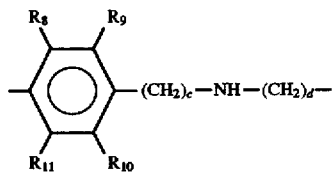

wherein c and d are integers from 1 to 5 and c+d are no greater than 6;

$R_6$ and $R_7$ can be the same or different and are —H or —$(CH_2)_b CH_3$; and remaining of $R_1$, $R_2$ and $R_3$ are

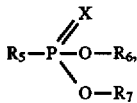

an alkyl group having 1 to 5 carbon atoms; or

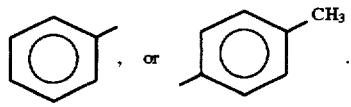

In a second embodiment, the composite materials of the present invention have the formula:

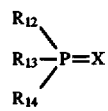

wherein X is S or O; at least one of $R_{12}$, $R_{13}$ and $R_{14}$ is

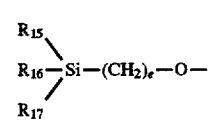

wherein at least one of $R_{15}$, $R_{16}$ and $R_{17}$ is SUPPORT—O— and remaining of $R_{15}$, $R_{16}$ and $R_{17}$ are unsubstituted or lower alkyl or lower aryl substituted saturated hydrocarbon chains having 1 to 20 carbon atoms, and e is an integer from 1 to 5; and remaining of $R_{12}$, $R_{13}$ and $R_{14}$ are OH, —O—$(CH_2)_f CH_3$, or —$(CH_2)_f CH_3$ wherein f is an integer from 0 to 5.

A third embodiment of the invention is a composite material prepared by solvent deposition on silylated surfaces having the formula:

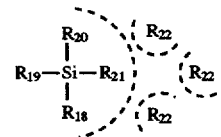

wherein at least one of $R_{18}$, $R_{19}$ and $R_{20}$ is SUPPORT—O— and $R_{21}$ is unsubstituted or lower alkyl substituted or lower aryl substituted hydrocarbon chain having 1 to 20 carbon atoms, or

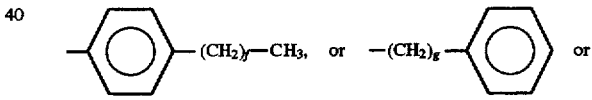

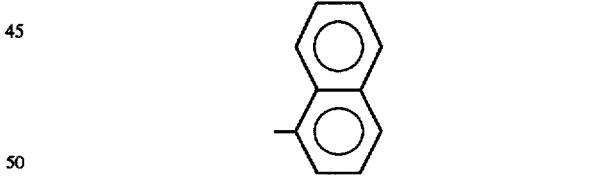

wherein f is an integer from 0 to 20 and g is an integer from 1 to 10; and others of $R_{18}$, $R_{19}$, and $R_{20}$ are $R_{21}$, $R_{22}$ is a ligand having the formula

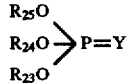

wherein Y is O and only one of $R_{23}$, $R_{24}$ and $R_{25}$ is H and other of $R_{23}$, $R_{24}$, and $R_{25}$ are unsubstituted or lower alkyl substituted hydrocarbon chains having 5 to 25 carbon atoms or all of the $R_{23}$, $R_{24}$ and $R_{25}$ are unsubstituted or lower alkyl substituted hydrocarbon chains having 5 to 25 carbon atoms, or

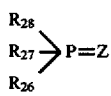

wherein Z is O or S and $R_{26}$–$R_{28}$ are unsubstituted or lower alkyl substituted hydrocarbon chains having 5 to 25 carbon atoms, or

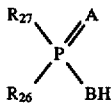

wherein A and B are the same or different and are O or S, and wherein $R_{22}$ is adsorbed on $R_{21}$.

DETAILED DESCRIPTION OF THE INVENTION

Figure 1:
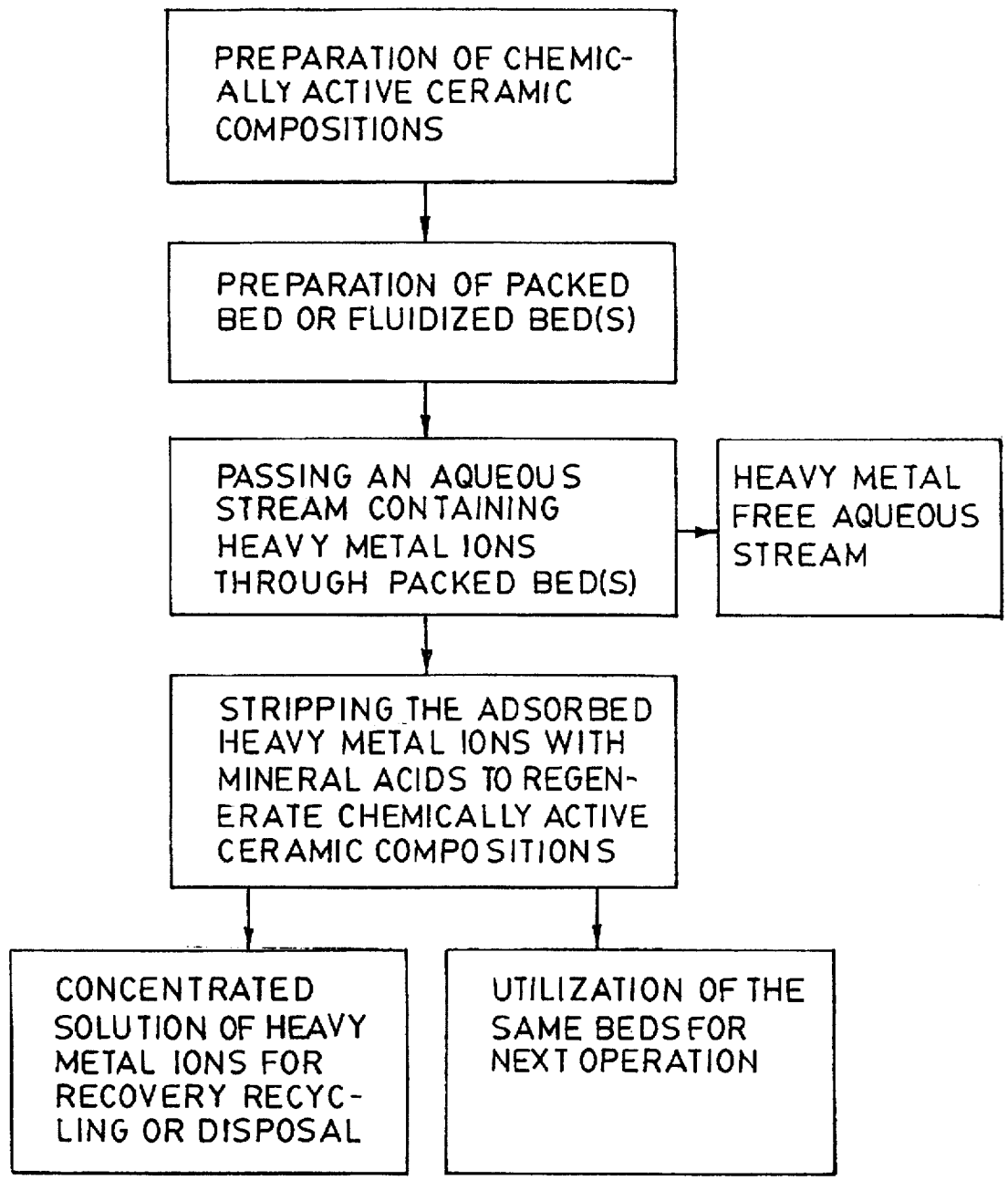
FIG. 1 is a flow chart of the process for separation and recovery of heavy metal ions with chemically active ceramic compositions.

The present invention relates to the preparation and use of chemically active ceramic compositions for removing metal ions from solutions and especially from aqueous waste streams. More particularly, the present invention relates to compositions that have very high capacities for chelating heavy and/or rare earth metals and can be readily designed to selectively remove individual metals. Furthermore, the present invention relates to methods of making and using those compositions.

The ceramic inorganic carriers useful to prepare the compositions of the present invention are those ceramic materials having terminal hydroxy groups. For example, alumina, titanium oxide, zirconium oxide, and silica-alumina are all useful in the compositions of the present invention. Silica gels are preferred due to the high density of hydroxy groups per unit surface area, higher overall surface area, and varying particle size. The silica gels preferred for use in the present compositions are in the form of particles (e.g., beads) having a diameter generally in the range of 3 mesh (about 0.635 cm) to 270 mesh (about 53 μm), Tyler sieve scale. Most preferably, the silica gel beads used in accordance with the present invention have a diameter in the range of 14 to 270 mesh, have surface area of about 350 to 600 m²/gm and pore sizes (diameters) of about 40 to 150 angstroms. A For the purposes of the present invention, the inorganic carrier portion of the inventive composite mat&rials shall hereafter be designated "SUPPORT". According to one aspect of the present invention, chemical compounds used as linking groups (i.e., groups which attach the chelating agent to the support) provide a linking chain between the chelating agent and the support to effect covalent bonding. This linkage is achieved by covalently bonding one end of the linking group to the support and another end of the linking group to the chelation agent. In the former case, the covalent bond is formed after removal of the hydrogen from the hydroxyl groups of the support. The covalent bonding site on the support is designated herein as "SUPPORT—O—". In another aspect of the present invention, a silylating agent is covalently attached to the support and provides a hydrophobic surface suitable for effecting adsorption of a chelating agent on to the support.

In one embodiment of the present invention, the composite material useful for removing heavy metals from waste streams has formula (I) below:

wherein at least one of $R_1$, $R_2$, and $R_3$ is SUPPORT—O— and $R_4$ is

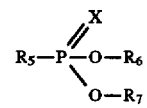

wherein X is S or O; $R_5$ is —$(CH_2)_a$—, where a is an integer from 1 to 5; or

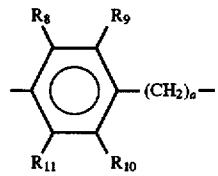

wherein $R_8$–$R_{11}$ are the same or different and are —H or —$(CH_2)_b CH_3$, where b is an integer from 0 to 20; or

or

-continued

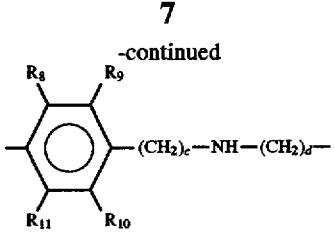

wherein c and d are integers from 1 to 5 and c+d is no greater than 6;

$R_6$ and $R_7$ are the same or different and are —H or —$(CH_2)_b CH_3$; and remaining of $R_1$, $R_2$ and $R_3$ are

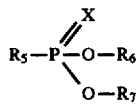

or an alkyl group having 1 to 5 carbon atoms; or

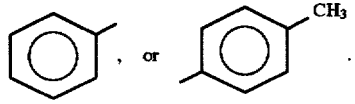

In preferred embodiments, only one of $R_1$, $R_2$ and $R_3$ is SUPPORT—O— and the others of $R_1$, $R_2$ and $R_3$ are —$CH_3$, $R_5$ is —$CH_2$— or —$(CH_2)_3$—, X is O, and $R_6$ and $R_7$ are —H.

In a second embodiment, the composites of the present invention have formula (II), below:

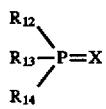 (II)

wherein X is S or O; at least one of $R_{12}$, $R_{13}$ and $R_{14}$ is

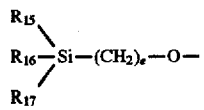

wherein at least one of $R_{15}$, $R_{16}$ and $R_{17}$ is SUPPORT—O— and remaining of $R_{15}$, $R_{16}$ and $R_{17}$ are unsubstituted or lower alkyl or lower aryl substituted saturated hydrocarbon chains having 1 to 20 carbon atoms, and e is an integer from 1 to 5; and remaining of $R_{12}$, $R_{13}$ and $R_{14}$ are —OH, —O—$(CH_2)_f CH_3$, or —$(CH_2)_f CH_3$ wherein f is an integer from 0 to 5.

Preferably, X is O, $R_{12}$ is

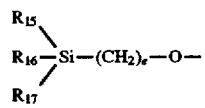

with $R_{15}$, $R_{16}$ and $R_{17}$ each SUPPORT—O—, and $R_{13}$ and $R_{14}$ are —$OCH_3$.

A third embodiment of the present invention is a composite material prepared by solvent deposition on silylated surfaces, having the formula:

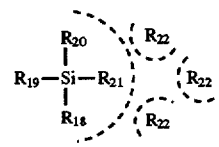

wherein at least one of $R_{18}$, $R_{19}$ and $R_{20}$ is SUPPORT—O— and $R_{21}$ is unsubstituted or lower alkyl substituted or lower aryl substituted hydrocarbon chain having 1 to 20 carbon atoms, or

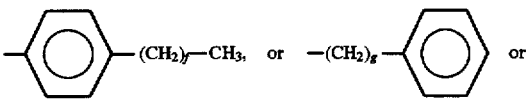

wherein f is an integer from 0 to 20 and g is an integer from 1 to 10; and others of $R_{18}$, $R_{19}$, and $R_{20}$ are $R_{21}$ and $R_{22}$ is a ligand having the formula

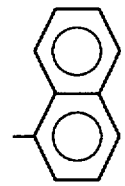

wherein Y is O and only one of $R_{23}$, $R_{24}$ and $R_{25}$ is —H and others of $R_{23}$, $R_{24}$, and $R_{25}$ are unsubstituted or lower alkyl substituted hydrocarbon chains having 5 to 25 carbon atoms or all of $R_{23}$, $R_{24}$ or $R_{25}$ are unsubstituted or lower alkyl substituted hydrocarbon chain having 5 to 25 carbon atoms, or

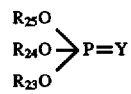

wherein Z is O or S and $R_{26}$–$R_{28}$ are unsubstituted or lower alkyl substituted hydrocarbon chain having 5 to 25 carbon atoms, or

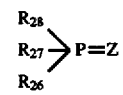

wherein A and B are the same or different and are O or S, and wherein $R_{22}$ is adsorbed on $R_{21}$.

Preferably, only one of $R_{18}$, $R_{19}$, and $R_{20}$ is SUPPORT—O— which increases the extent of the hydrophobic nature of the surface.

The compositions of the present invention can be produced by a variety of methods in accordance with the present invention. One method is covalent attachment of phosphonic acid to the surface of the ceramic substrate via several routes. One Such route includes (1) preparation of a chloroalkyl group on the ceramic substrate by reacting the substrate with a chloroalkyl silane (e.g., chloromethyldimethylchlorosilane, chloromethyldichloromethyl-silane, 3-chloropropyl-triethoxysilane, chloromethyldimethylisopropoxysilane, chloromethyl(di-isopropoxy) silane), and (2) reacting the chloroalkyl modified substrate with phosphorous trichloride in the presence of anhydrous aluminum chloride, and (3) hydroxylizing the product with water, a mixture of water and ethyl alcohol or ethyl alcohol.

A preferred synthetic process includes preparing a 20–50 vol % solution of a chloroalkyl silane in a solvent (e.g., toluene, xylene, benzene, hexane or cyclohexane). For example, a solution containing 40–50% by volume of chloromethyldimethyl-chlorosilane is dissolved in toluene. This solution is refluxed with the substrate at 75°–85° C. for 8 to 10 hours. The chloromethylated substrate is then reacted with phosphorous (III) chloride in the presence of anhydrous aluminum chloride at 70°–75° C. for 8 to 10 hours. After completion of reaction, the substrate is filtered and washed with toluene, and stirred with water to hydrolyze chlorine groups to hydroxyl group of the substrate.

Another method of producing the present composite materials is by solvent deposition of the ester of phosphoric acid (e.g., di-(2-ethylhexyl) phosphoric acid, dihexadecyl phosphate, mono-dodecyl phosphate). In the deposition process, the support surface is first modified to create a hydrophobic surface by silinization. Suitable silylating agents include dimethyldichlorosilane, trimethylchlorosilane, tri-hexylchlorosilane, n-octadecyltrichlorosilane. A preferred silylating agent is dimethyldichlorosilane. Alternatively, the support's surface can be rendered hydrophobic through the use of grignard reagents (e.g., propylmagnesium chloride, decylmagnesium bromide, octadecylmagnesium chloride).

Silylation can be accomplished by dissolving the silylating agent or grignard reagent in a suitable solvent (e.g., toluene, carbon tetrachloride, chloroform, nitrobenzene, diethyl ether) and contacting the support with the resulting solution for 3 to 12 hours at a temperature of 40° to 90° C.

Next the silylated surface of the substrate is treated to deposit a dialkyl phosphoric acid (e.g., di-(2-ethylhexyl) phosphoric acid, dihexadecyl phosphate) by dissolving suitable amounts of the dialkyl phosphoric acid in a suitable solvent (e.g., carbon tetrachloride, chloroform, nitrobenzene, toluene). For example, a solution containing 0.5 to 10 vol % di-(2-ethylhexyl) phosphoric acid can be used. In particular, 3.0 to 6.0 vol % solution of di-(2-ethylhexyl) phosphoric acid in toluene is prepared. This solution is slurred with the silinized substrate, and the slurry is heated to 50°–80° C. under light vacuum (28 to 23 mm Hg) until the solvent has evaporated thus depositing the di-(2-ethylhexyl) phosphoric acid on the surface of the substrate.

Another method of making the present composite materials is by the solvent deposition of phosphorous based acids or esters thereof (e.g., n-octadecylphosphonic acid, n-octylphosphonic acid, bis(2,4,4-trimethyl pentyl) phosphinic acid, bis(2,4,4-trimethyl pentyl) monothiophosphinic acid, bis(2,4,4-trimethyl pentyl) dithiophosphinic acid, bis(2,4,4-trimethyl pentyl) octylphosphine oxide, triisobutyl phosphine sulfide, benzene phosphinic acid, n-octyl phosphinic acid) on the surface of a silinized substrate. The silinized substrate (silinized as described supra) is treated to deposit the phosphorous-based acid by preparing a 0.5 to 10 vol % solution of the acid in a solvent (e.g., carbon tetrachloride, chloroform, nitrobenzene, toluene). An exemplary method utilizes a solution containing 0.5 to 10 vol %, preferably 3.0 to 5.0 vol % of bis(2,4,4-trimethylpentyl)phosphinic acid in toluene. This solution is slurried with the silinized substrate, and the slurry is heated at 50° to 80° C. under light vacuum (28 to 23 mm/Hg) until the solvent has evaporated thus depositing the phosphorous-based acid on the surface of the substrate.

A preferred method of making the compositions of the present invention is by first preparing a 3–5 vol % solution of bis(2,4,4-trimethylpentyl)monothiophosphinic acid in a solvent such as toluene. That solution is slurried with the silinized substrate and the slurry is heated at 50°–80° C. under a light vacuum (28 to 23 mm Hg) until the solvent has evaporated, thus depositing the phosphorous-based acid on the surface of the substrate.

The compositions of the present invention have the capability of removing, in a selective manner, heavy metal ions in dilute solutions from aqueous streams. The compositions of the present invention in general can be used for removal from aqueous streams of heavy metals such as antimony, arsenic, beryllium, cadmium, chromium, copper, lead, mercury, nickel, selenium, silver, thallium, tin, zinc, molybdenum, palladium, platinum, silver, gold, cobalt, technetium, rhenium, cesium and strontium and rare earth metals such as cerium, neodymium, and praseodymium.

Typically, the compositions of the present invention are placed in packed beds or fluidized beds and the waste stream is passed through the bed. The compositions act to chelate with the unwanted metal ions, even if the ions are present in only dilute concentrations. Examples of useful beds for the chelating compositions described herein are found in U.S. Pat. Nos. 4,824,576 to Sood et al. and 4,448,694 to Plueddemann, the disclosures of which are hereby incorporated by reference.

Figure 2:
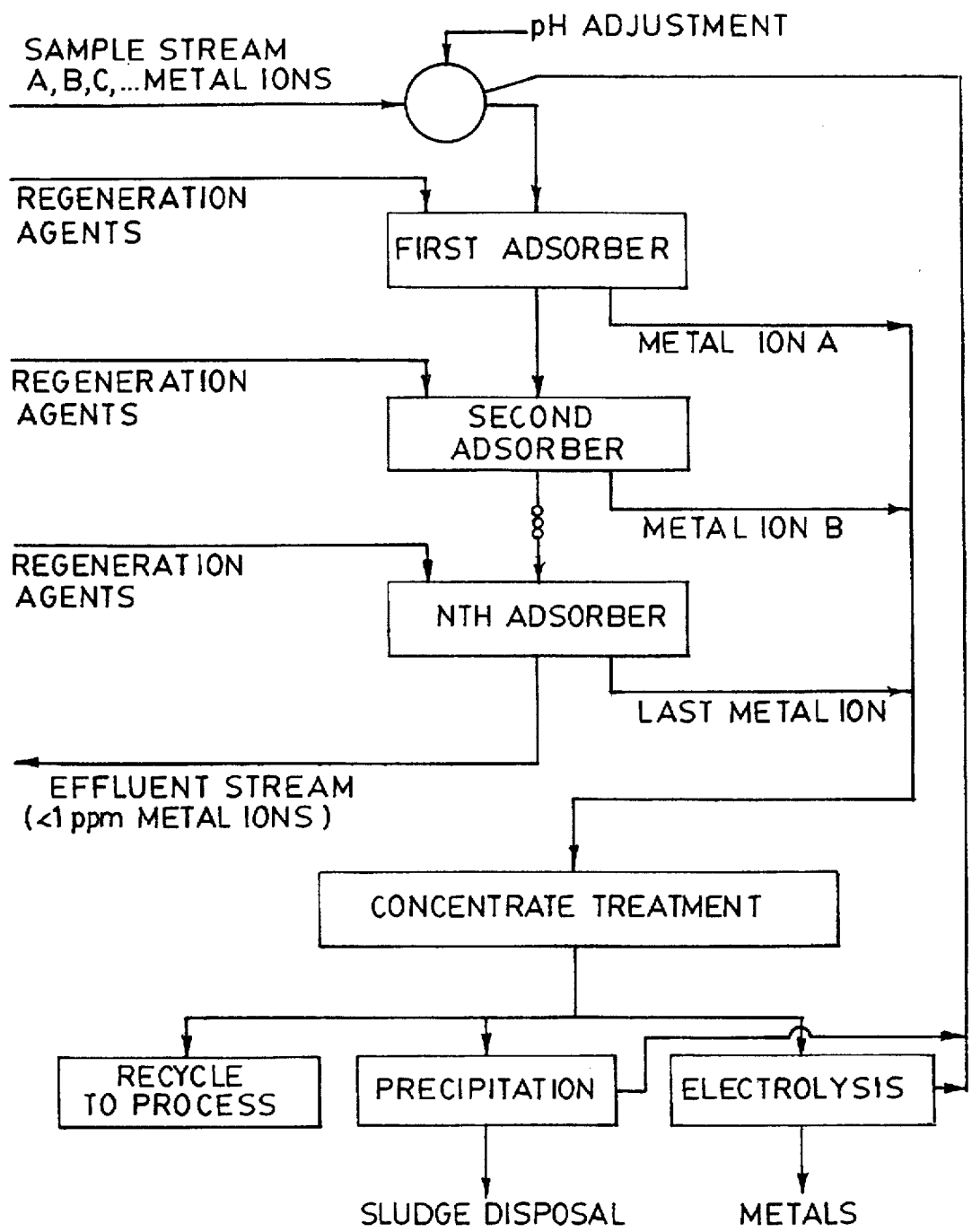
FIG. 2 is a flow chart illustrating the process of the invention by using different inventive compositions in a series of multiple adsorbent beds for metal ion separation and/or metal recovery.

The compositions of the present invention can be used for removal and recovery of heavy metal ions by a variety of methodologies as outlined by FIGS. 1 and 2. FIG. 1 is a process outline for separation and recovery of metal ions with chemically active inorganic carriers. FIG. 2 is a flow sheet illustrating the process of the invention by using a series of multiple adsorbent beds for metal ion separation and/or metal recovery.

The process of metal ion removal of the present invention contemplates several modes of operation. Many factors are considered in choosing the appropriate methodology, including the composition of the aqueous stream to be treated, the industrial process through which the contaminated aqueous stream is generated, the desired purification level of the aqueous stream, the degree of separation of metal ions from the waste stream desired, and the end use of the effluent from the bed.

In one embodiment of the present process, an operation mode can be employed to remove all metal ions simultaneously from an aqueous stream containing multiple metal ions by passing the stream through a single adsorbent packed bed or fluidized bed containing a composition according to the present invention. The column breakthrough volume (e.g., the volume at which a minimum threshold concentration of metal ions in the effluent is exceeded) can be determined by monitoring the metal ion concentration in the effluent with an atomic absorption spectrophotometer, flow injection analysis, ion selective electrodes, or other known methods of metal ion concentration analysis and/or monitoring pH of the effluent.

The loaded column can be regenerated by desorbing the adsorbed metal ions from the column. The adsorbed metal ions can be recovered simultaneously by, for example, stripping all metals from a bed of chemically active silica gel with mineral acid (e.g., nitric acid, hydrochloric acid), as discussed supra. Upon regeneration, the chemically active inorganic carrier bed can be used for the next operation. The metal ion concentrate obtained during regeneration can be used to recover metals present by any one of two techniques or disposed of the metals as a sludge as illustrated in FIG. 2. In the first recovery method, the metals are recovered by electrolysis. The second method involves recycling the metal concentrate back to the process which first generated the polluted aqueous stream. In the third method, the metals can be precipitated to form sludge which can subsequently be disposed of in an environmentally safe manner.

In accordance with the present invention, it has been unexpectedly discovered that the efficiency of the removal process relative to certain metal ions is dependent on the pH of the waste stream. Therefore, as shown in FIG. 2 the pH of the waste stream can be advantageously adjusted if necessary (depending on the composite material used). This operation process is typically performed by buffering an aqueous stream entering the bed of chemically active ceramic composition. Alternatively, instead of employing a buffer solution, it is possible to use a dilute ammonium hydroxide solution to simply adjust the pH of an acidic aqueous stream entering the packed or fluidized bed of chemically active inorganic carrier. In that case, because the inventive materials are acidic in nature and release protons when they adsorb metal ions, the pH of the effluent stream decreases as additional bed volumes pass through the bed. The pH of effluent stream decreases and reaches a minimum value whereby it becomes acidic. The inventive materials have a preferred pH band at which the adsorption efficiency for each metal ion is maximized. A pH below that pH is defined as acidic for the purposes of the present invention. At that pH, the adsorption of metal ions on the composite bed has been found to decrease. That point is termed the "breakthrough point" and can be determined by monitoring the pH of the effluent stream or by monitoring the metal ion concentration in the effluent aqueous stream.

At the breakthrough point, the flow of aqueous stream through the bed can be stopped, and the bed can be made operational again by passing one or more bed volumes (i.e., an amount of fluid equal to the volumetric fluid capacity of the bed) of buffer solution through the bed. Buffering the column reestablishes the initial pH and extends the adsorptive life of the column and allows its use for the adsorption of metal ions until the column approaches its adsorption capacity (i.e., the point at which substantially all of the available sites for chelation of heavy metal ions are occupied) as determined by breakthrough volume.

Adjusting the fluid stream pH with ammonium hydroxide (rather than using a buffer at the start) is highly advantageous because it decreases the cost of operation and minimizes the contamination of the effluent aqueous streams with buffer solutions, enabling environmentally safe disposition of the effluent. It is also possible to determine the breakthrough point by simply monitoring the pH of the effluent stream.

In another embodiment of the present process, all the metal ions in a waste stream containing more than one type of species of metal ion can be simultaneously removed by passing the waste stream through the single bed of chemically active inorganic carriers.

The selectivity of the inventive materials is highly advantageous. For example, a single metal ion from the aqueous stream containing multiple metal ions can be removed by passing the stream through a single packed or fluidized bed of the inventive composite materials where removal, recycling or disposal of only one metal ion is desired. The adsorbed metal ion can be desorbed from the bed of chemically active inorganic carrier with mineral acid. For example, a composite material as described above can be used to remove lead, cadmium and/or zinc from the aqueous stream buffered to a suitable pH and containing lead, cadmium, and/or zinc, calcium and magnesium. The adsorbed metals can be recovered by stripping with dilute mineral acids, and the regenerated bed can be utilized for the next operation. The metal ion concentrate can be used to recover, recycle or dispose of those metals using techniques such as electrolysis, recycling and precipitation, as discussed above.

The selectivity exhibited by certain of the compositions of the present invention is also highly advantageous due to the high concentration of metal ions such as calcium and magnesium present in typical waste streams that do not need to be removed. In conventional heavy metal-removing beds, nonselective materials remove calcium or magnesium ions (as well as the heavy metal contaminants) and become quickly saturated due to the high concentration of magnesium and calcium in most aqueous waste streams. The bed must then be frequently regenerated (if possible) or replaced. On the other hand, the inventive composite materials selectively remove only the target heavy metal ions (e.g., lead, cadmium). Therefore, the composite material does not become as quickly saturated and can be used for longer periods without regeneration or replacement. As noted more specifically in the Examples (infra) certain of the inventive materials (e.g., the thiophosphinic acid composites) are capable of removing heavy metal ions for up to 50 (or more) bed volumes and have extraordinarily high adsorption capacities for cadmium.

In another embodiment of the process of the present invention, metal ions can be separately and specifically removed by adsorbing those metal ions on a series of metal ion selective beds. As illustrated in FIG. 2, the metal ions can be removed in a sequential manner from the aqueous stream containing a mixture of multiple metal ions by passing the stream through the multiple beds where each bed contains an inventive composite that selectively removes one of the metal ions. The breakthrough point of the beds can be determined by monitoring the metal ion concentration in the effluent stream from the column by the methods discussed supra. These multiple beds can then be regenerated as described above and the metal ions removed from the bed can be recycled or disposed of.

For example, lead and cadmium can be removed from a waste stream buffered to a pH of about 5.0 and containing lead and cadmium by passing the stream first through a composite containing a phosphinic acid containing composite to remove lead. The waste can next be passed through a bed containing a monothiophosphinic-containing composite according to the present invention to remove cadmium. In that way the heavy metal ions are separated from the waste stream and from each other and can be easily recaptured and recycled in to the original manufacturing process. Accordingly, the processes and materials of the present invention can completely remove and separate two distinct metal ions and facilitate maximum utilization of the bed's relative capacities, thereby providing valuable increased efficiency in the metal ion removal process.

In another embodiment of the process of the present invention, all the targeted metal ions in a waste stream containing more than one type of species of metal ion can be simultaneously removed by passing the waste stream through the single bed of composite materials prepared according to the present invention. The adsorbed metals can then be separated by selectively desorbing the metals with mineral acids while regenerating the bed. Such a process is explained in detail in the examples below.

The present invention is further described by the following non-limiting examples.

Example 1

A 50 vol % solution of dimethyldichlorosilane in toluene was prepared. The surface of a quantity of silica gel beads having a size of 70–270 mesh was silinized by mixing the beads while stirring in a vessel with a refluxing condenser in the dimethyldichlorosilane solution for 6 hours at a temperature of 65° to 70° C. The initial weight percent ("wt%") of dimethyldichlorosilane to the silica gel in the reaction solution was 110.4.

Next, a 5.0 vol % solution of bis(2,4,4-trimethylpentyl) phosphinic acid (chelating agent) dissolved in toluene was prepared. The bis(2,4,4-trimethylpentyl)phosphinic acid was deposited on the silinized silica gel by mixing the chelating agent solution with the silinized silica gel using a rotary vacuum evaporator, heating the slurry at 45° to 50° C. under a light vacuum (about 28 to 23 mm Hg) until the solvent was evaporated. The material prepared according to this example is designated as Sample A.

Example 2

A 50 vol % solution of dimethyldichlorosilane in toluene was prepared. The surface of a quantity of silica gel beads having a size of 70–270 mesh was silinized by mixing the beads while stirring in a vessel with a refluxing condenser in the dimethyldichlorosilane solution for 6 hours at a temperature of 65° to 70° C. The initial weight percent ("wt%") of dimethyldichlorosilane to the silica gel in the reaction solution was 110.4.

Next, a 5.0 vol % solution of bis(2,4,4-trimethyl pentyl) monothiophosphinic acid (chelating agent) in toluene was prepared. The bis(2,4,4-trimethylpentyl) monothiophosphinic acid was deposited on the silinized silica gel by mixing the chelating agent solution with the silinized silica gel using a rotary vacuum evaporator, heating the slurry at 45° to 50° C. under a light vacuum (about 28 to 23 mm Hg) until the solvent was evaporated. The material prepared according to this example is designated as Sample B.

Example 3

A 50 vol % solution of dimethyldichlorosilane in toluene was prepared. The surface of a quantity of silica gel beads having a size of 70–270 mesh was silinized by mixing the beads while stirring in a vessel with a refluxing condenser in the dimethyldichlorosilane solution for 6 hours at a temperature of 65° to 70° C. The initial weight percent ("wt%") of dimethyldichlorosilane to the silica gel in the reaction solution was 110.4.

Next, a 5.0 vol % solution of di-(2-ethylhexyl)phosphoric acid in toluene was prepared. This solution was mixed using a rotary vacuum evaporator with the silinized silica gel, and the slurry is heated to 45°–50° C. under a light vacuum (28 to 23 mm/Hg) until the solvent has evaporated to deposit the di-(2-ethylhexyl)phosphoric acid on the surface of the silinized silica gel. The material prepared according to this example is designated as Sample C.

Example 4

A 23 vol % solution of chloromethyldimethylchlorosilane in toluene was prepared. The surface of a quantity of silica gel beads having a size of 70–270 mesh was silinized by mixing the beads while stirring in a vessel with a refluxing condenser in the chloromethyldimethyl-chlorosilane solution for 6 hours at a temperature of 75° to 85° C. The initial weight percent ("wt%") of chloromethyldimethyl-chlorosilane to the silica gel in the reaction solution was 50.0.

The chloromethylated silica gel was reacted with phosphorus(III) chloride in the presence of anhydrous aluminum(III) chloride at 70°–74° C. for six hours. After completion of the reaction, the silica gel was filtered and washed with toluene and stirred with water. The material prepared according to this example is designated as Sample D.

Example 5

Sample A beads were packed in a one centimeter ("cm") diameter column to a height of 10 cm to prepare a packed bed. Aqueous solution containing lead ions at a concentration of 200 parts per million ("ppm") and cadmium ions at a concentration of 200 parts per million ("ppm") were flowed throughout the packed column at a flow rate of 1 milliliter per minute to provide approximately 10 minutes of residence or contact time between the solution and the chemically active silica gels. The aqueous solution was buffered at pH 6.5 using acetate buffer.

The capacity of the chemically active silica gel beads for a given metal ion (expressed as milligrams of ion chelated per gram of material ("mg/g")) was determined by performing breakthrough studies on the packed bed. Accordingly, an aqueous solution containing metal ions was passed through the column at a flow rate of 1 ml/minute and the metal ion concentration in the effluent from the column was determined with an atomic absorption spectrophotometer. Thus, capacity of the ceramic compositions was calculated from the total amount of metal ion adsorbed on the bed to saturation of the bed.

The concentration of the effluent was measured periodically to determine the number of bed volumes that could be treated by the packed column before the beads were saturated and no longer removed the metal ion from the stream. The initial capacity was calculated at the end of the first period of saturation of the bed. Saturation is defined as a state after which no more metal ions are adsorbed on the bed. Thus, after saturation of the bed the concentration of metal ion in the solution entering the bed (feed solution) is, generally, equal to the concentration of metal ions in the solution coming out of the bed (effluent solution). The packed bed saturated with metal ions was then regenerated by stripping the metal ions from the packed bed using about four bed volumes of 0.5M nitric acid. The combined sequence of saturation of the bed with the metal ions from the feed solution and regeneration of the bed by stripping the adsorbed metal ions from the synthesized adsorbents in the bed is denoted as one cycle of operation. The bed was operated for twenty cycles of adsorption and stripping and the capacity was measured at the end of the twentieth cycle to evaluate the durability of the packed bed.

Separate packed beds were also prepared according to the procedures described above using, discretely, Sample B, C and D beads. Capacity studies were done for each of the Sample B and C columns according to the above procedure with the exception that the aqueous solution flowed through the Sample B and C columns contained 200 ppm cadmium. No capacity studies were done for the Sample D column, although an aqueous solution containing 200 ppm neodymium was passed through the Sample D column using the procedures described above. The results are shown in Table I below. The percentage recovery for each sample is represented as "% Recovery."

TABLE I

|  | Sample → | | |
|---|---|---|---|
|  | A | B | C |
| Lead Capacity (mg/g) | | | |
| Fresh | 18.63 | — | — |
| 20 Cycles | 6.55 | — | — |
| Cadmium Capacity (mg/g) | | | |
| Fresh | 13.60 | 19.77 | 13.30 |
| % Recovery | 92.1 | 99.6 | 99.6 |

As shown by Table I, each of the Sample A, B, and C columns exhibited high capacities for removing lead and/or cadmium from an aqueous stream. D also successfully removed neodymium from the aqueous stream.

In each of columns A, B, and C, excellent recovery of the lead (over 93%) and the cadmium (about 99%) was achieved. That result is further evidence of the great usefulness of the compositions of the present invention. Unlike most prior art methods of removing heavy metals from waste streams, the inventive materials allow easy removal of the ion from the packed bed either for disposal or, preferably, for recycling back into the original manufacturing process.

Example 6

Example 6 illustrates the relationship between pH and the ability of the compositions of the present invention to remove various metals from solution. Examples 6 also illustrates the selectivity of various of the compositions of the present invention under the appropriate conditions.

Sample A, Sample B and Sample C composite materials prepared according to Examples 1, 2 and 3, respectively, were used to extract various metals from aqueous solution having a metal ion concentration of 200 ppm. For each sample tested with a specific metal ion, three aqueous solutions, each of 25 ml, having different pHs were equilibrated with one gram of sample for one hour on a shaker apparatus. The pHs of the respective aqueous solutions were 3.5, 5.0 and 6.5 in each case. In each case the percent extraction ("% Extraction") was determined by measuring the initial concentration of the given metal ion in the aqueous solution (before it was equilibrated with the samples) and the final concentration of the given metal ion in the aqueous solution (after it was equilibrated with the samples.) The data compiled according to these procedures are listed in Table II below.

TABLE II

| Metal Ion | pH | % Extraction | | |
|---|---|---|---|---|
|  |  | Sample A | Sample B | Sample C |
| Lead(II) | 3.5 | 20.1 | 99.8 | 99.7 |
|  | 5.0 | 99.9 | 99.8 | 98.6 |
|  | 6.5 | 99.9 | 99.8 | 99.1 |
| Cadmium(II) | 3.5 | 0.0 | 99.9 | 99.2 |
|  | 5.0 | 13.6 | 99.9 | 99.7 |
|  | 6.5 | 99.9 | 99.9 | 99.6 |
| Calcium(II) | 3.5 | 0.0 | 0.0 | 35.5 |

TABLE II-continued

| Metal Ion | pH | % Extraction | | |
|---|---|---|---|---|
|  |  | Sample A | Sample B | Sample C |
|  | 5.0 | 26.9 | 3.8 | 54.5 |
|  | 6.5 | 75.0 | 7.0 | 99.3 |
| Magnesium(II) | 3.5 | 0.0 | 0.0 | 4.5 |
|  | 5.0 | 0.0 | 0.0 | 35.6 |
|  | 6.5 | 36.2 | 3.0 | 48.1 |
| Zinc(II) | 3.5 | — | 55.2 | — |
|  | 5.0 | — | 67.6 | — |
|  | 6.5 | — | 99.6 | — |
| Nd(III) | 3.5 | — | — | 90.0 |
|  | 5.0 | — | — | 99.9 |
|  | 6.5 | — | — | 99.9 |

As illustrated by Table II, the materials of the present invention exhibit advantageous selectivity for certain heavy metal ions. For example, neither Sample A, B nor C removed a significant percentage of magnesium or calcium at pH 3.5. Sample B did not remove significant amounts of magnesium or calcium at any pH. On the other hand, the materials of the present invention removed up to 99.9 percent of the "target" heavy metals (e.g., lead, cadmium, zinc). The selectivity of the present materials for the "target" heavy metals as opposed to magnesium and calcium is extremely advantageous in removing heavy metals from aqueous waste streams because of the high concentration of magnesium and calcium found in typical waste streams. Without the demonstrated selectivity of the inventive materials, the packed beds would rapidly become saturated with magnesium and calcium at the expense of capacity that otherwise could be utilized to remove the target heavy metals.

The present examples also demonstrate the effect of pH on the operation of the inventive materials. Sample A exhibited much better performance at pH of 5 or more for lead removal and 6.5 or more for cadmium removal. Sample B, on the other hand exhibited good performance for lead and cadmium at all tested pHs, but removed significantly more zinc at pH 6.5. The increased or decreased performance of the inventive materials relative to pH conditions can be advantageously exploited. For example, raising the pH of the waste stream as it enters the packed bed can significantly increase the performance of the bed and result in higher extraction percentages of the target heavy metals.

The pH of the waste stream could also be manipulated to tailor the packed bed's extraction characteristics to the particular properties of the subject waste stream. More specifically, if a waste stream exhibited a large concentration of lead and a relatively lower concentration of cadmium, it would be advantageous to use a composition exhibiting a relatively higher selectivity for lead. In such case, a first column containing Sample A beads could be used in conjunction with a second column containing Sample B beads along with an operation to adjust the pH of the waste stream to about 5.0 and effect efficient removal of lead and cadmium despite large variations in their concentrations.

Example 7

The procedures of Example 5 were repeated except that the aqueous stream was adjusted to pH 6.5 with ammonium hydroxide. Accordingly, Sample B beads were packed in a 1 cm diameter column to a height of 10 cm to prepare a packed bed. Aqueous solution having an initial pH adjusted to 6.5 with 0.1M ammonium hydroxide and 0.1M nitric acid and containing cadmium ions at a concentration of 200 ppm were flowed throughout the packed column at a flowrate of 1 ml/minute, thus providing approximately 10 minutes of residence contact between the solution and the inventive beads. The pH of every 2 ml aliquot of the effluent stream was measured throughout the period of saturation of the bed.

The inventive column lowered the cadmium concentration in the stream to less than 0.1 ppm for 24 bed volumes. The pH of the effluent stream after 24 bed volumes of effluent had been passed through decreased to 2.3. After the column stopped removing cadmium ions (approximately 32 bed volumes) the column was reconditioned by readjusting the pH to 6.5 by passing through one bed volume of an acetate buffer. After reconditioning, the column reduced the cadmium ion concentration in the effluent to less than 0.1 ppm for an additional 5 bed volumes.

Figure 3:
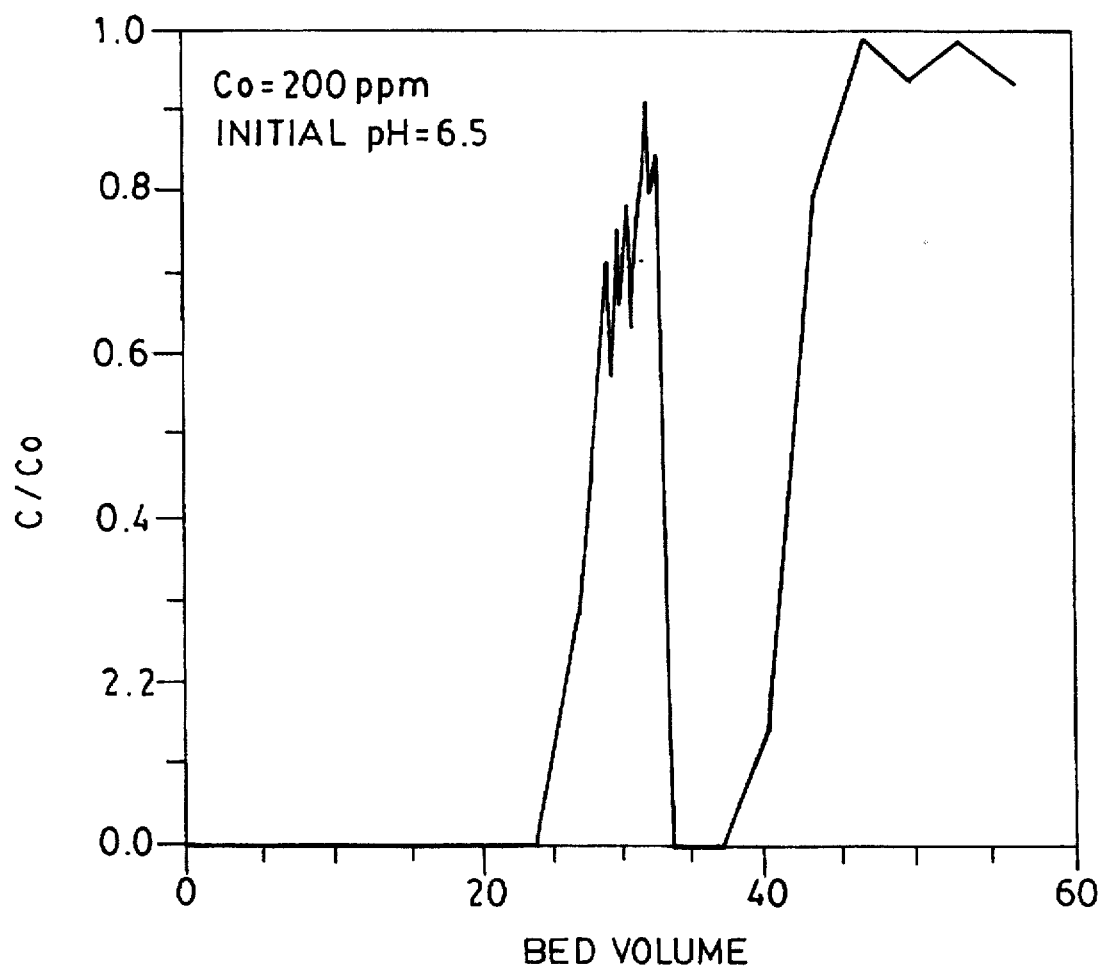
FIG. 3 is a graph illustrating the relationship of the cadmium ions removed (expressed as a ratio of the effluent cadmium ion concentration over the initial cadmium ion concentration) versus the bed volumes passed through a column containing composite material according to the present invention.
Figure 4:
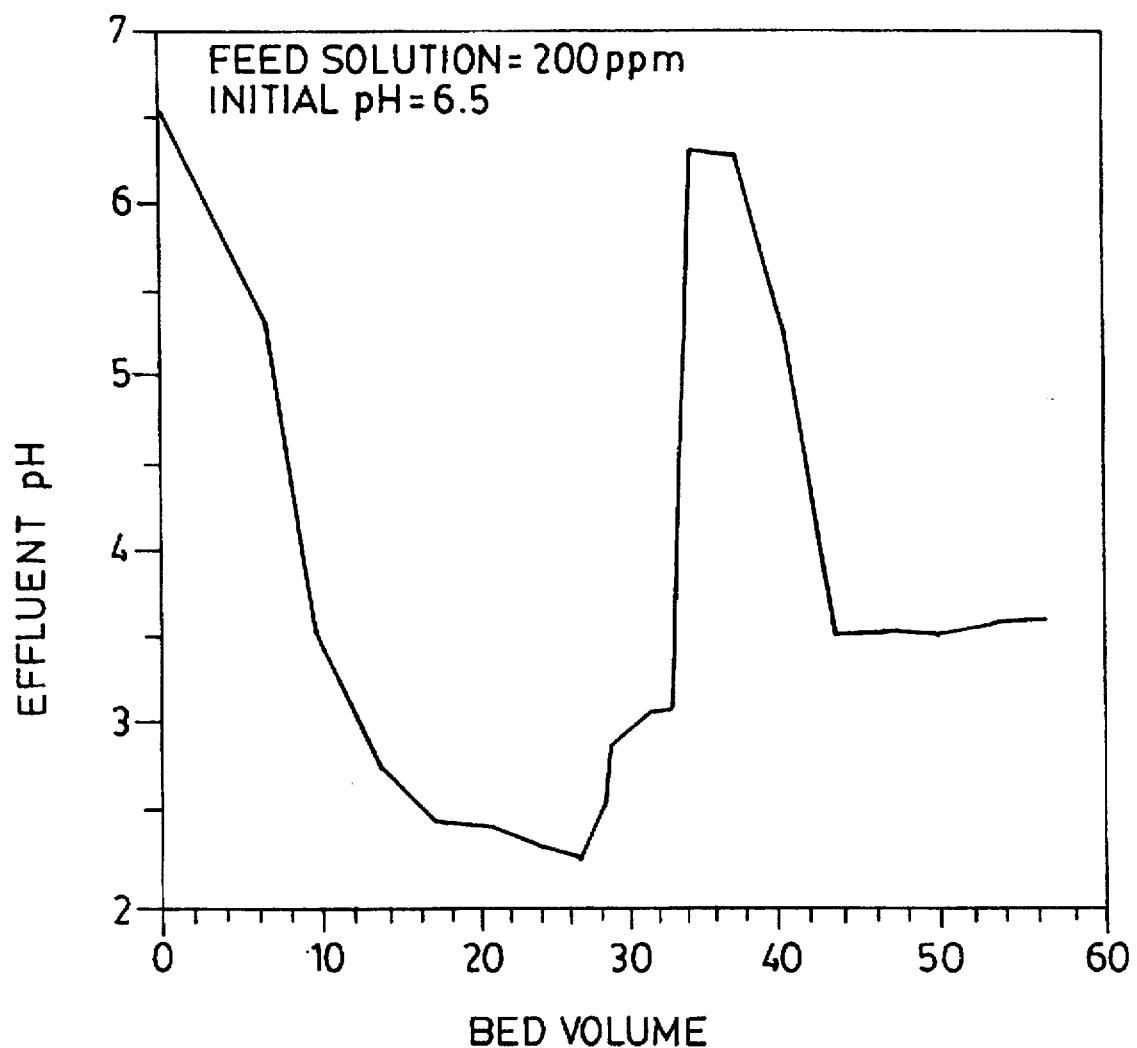
FIG. 4 illustrates the relationship between the pH of the effluent versus the bed volumes passed through a column containing composite materials prepared according to the present invention.

FIG. 3 illustrates the relationship of the cadmium ions removed (expressed as a ratio of the effluent cadmium ion concentration over the initial cadmium ion concentration) versus the bed volumes passed through the column. FIG. 4 illustrates the relationship between the pH of the effluent versus the bed volumes passed through the column. As shown by FIGS. 3 and 4, the metal ion removal performance of the column can be determined by monitoring the pH of the effluent. For example, an examination of the figures together reveals that the breakthrough volume (volume at which minimum threshold concentration of metal ions in the effluent is exceeded) for the column of Example 7 is about 24 bed volumes. FIG. 4 shows that the pH of the effluent decreases continuously as each bed volume passes through the column until the breakthrough volume is reached. At that point, the effluent pH actually begins to increase due to the decreased cadmium adsorption efficiency. Accordingly, it is seen that the pH of the effluent stream can be used to determine the breakthrough point of the packed column.

Example 8

A packed column containing Sample B beads was prepared according to the procedures described in Example 7. An aqueous stream containing 20 ppm lead, 40 ppm zinc, and 40 ppm cadmium and adjusted to pH 6.5 with 0.1M ammonium hydroxide and 0.1M nitric acid was passed through the packed column. The concentration of the effluent was measured periodically to determine the number of bed volumes that could be treated by the packed column (i.e., the breakthrough volume). The pH of the effluent was also monitored. When the pH of the packed column decreased to about 3.0 (about 28 bed volumes), the column was reconditioned by passing one bed volume of a pH 6.5 acetate buffer through the column. After reconditioning, additional bed volumes were passed through the column until the pH again approached about 3.0 (about 24 bed volumes). The bed was reconditioned again to allow it to reach its breakthrough volumes for zinc (about 60 bed volumes).

Figure 5:
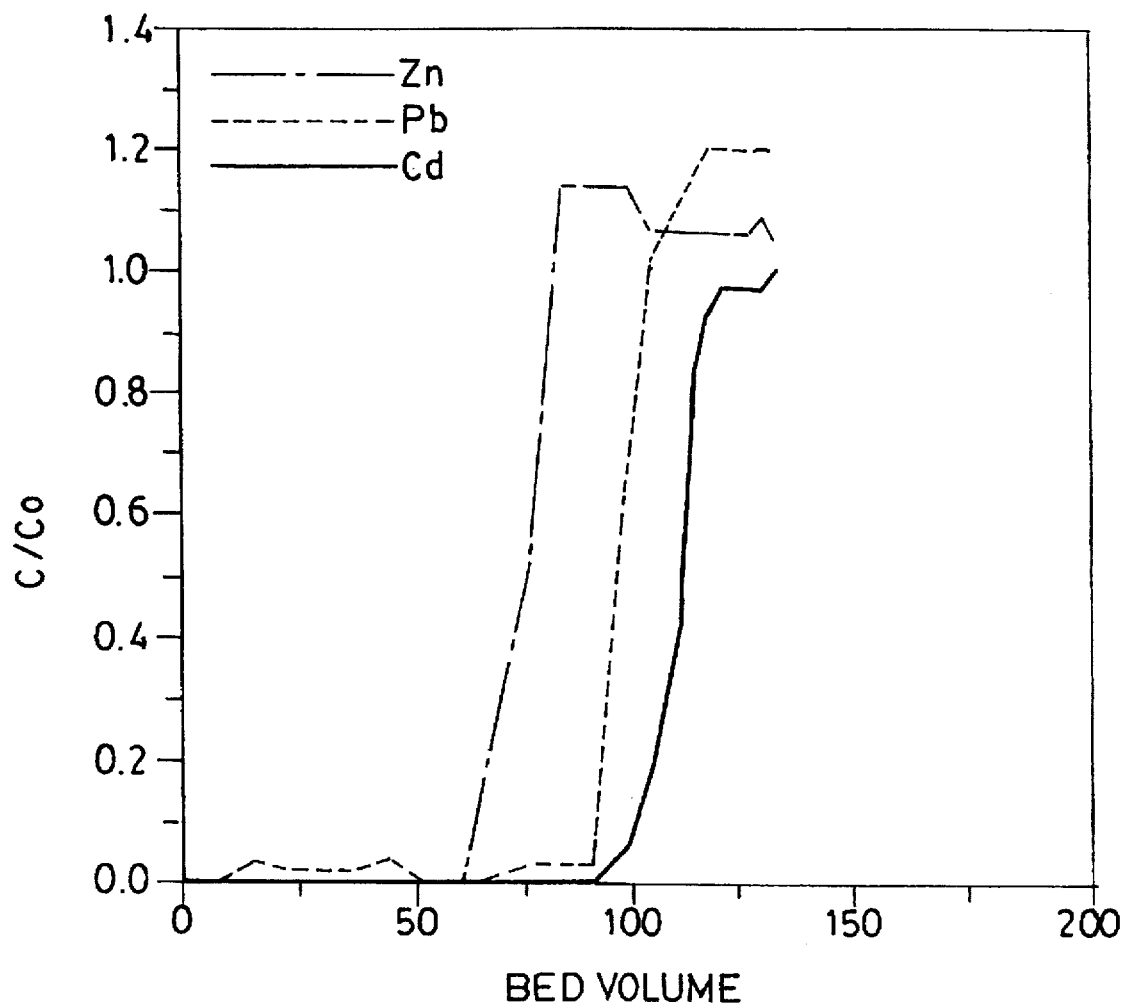
FIG. 5 illustrates the relationship between the ratio of lead, cadmium and zinc ion concentration in an effluent stream to the lead, cadmium and zinc ion concentration in a feed stream versus the bed volume passed through a column of composition prepared according to the present invention.

FIG. 5 illustrates the relationship between the ratio of lead, cadmium and zinc ion concentration in an effluent stream to the lead, cadmium and zinc ion concentration in a feed stream versus the bed volume passed through a column of composition prepared according to the present invention. FIG. 5 illustrates that the packed column reduced the concentration of all three of the targeted ions to less than 1.0 ppm for up to 60 bed volumes. Furthermore, lead and cadmium would be removed for an additional 30 bed volumes after zinc breakthrough. However, additional removal of lead and cadmium results in zinc desorption from the bed.

Example 9

Figure 6:
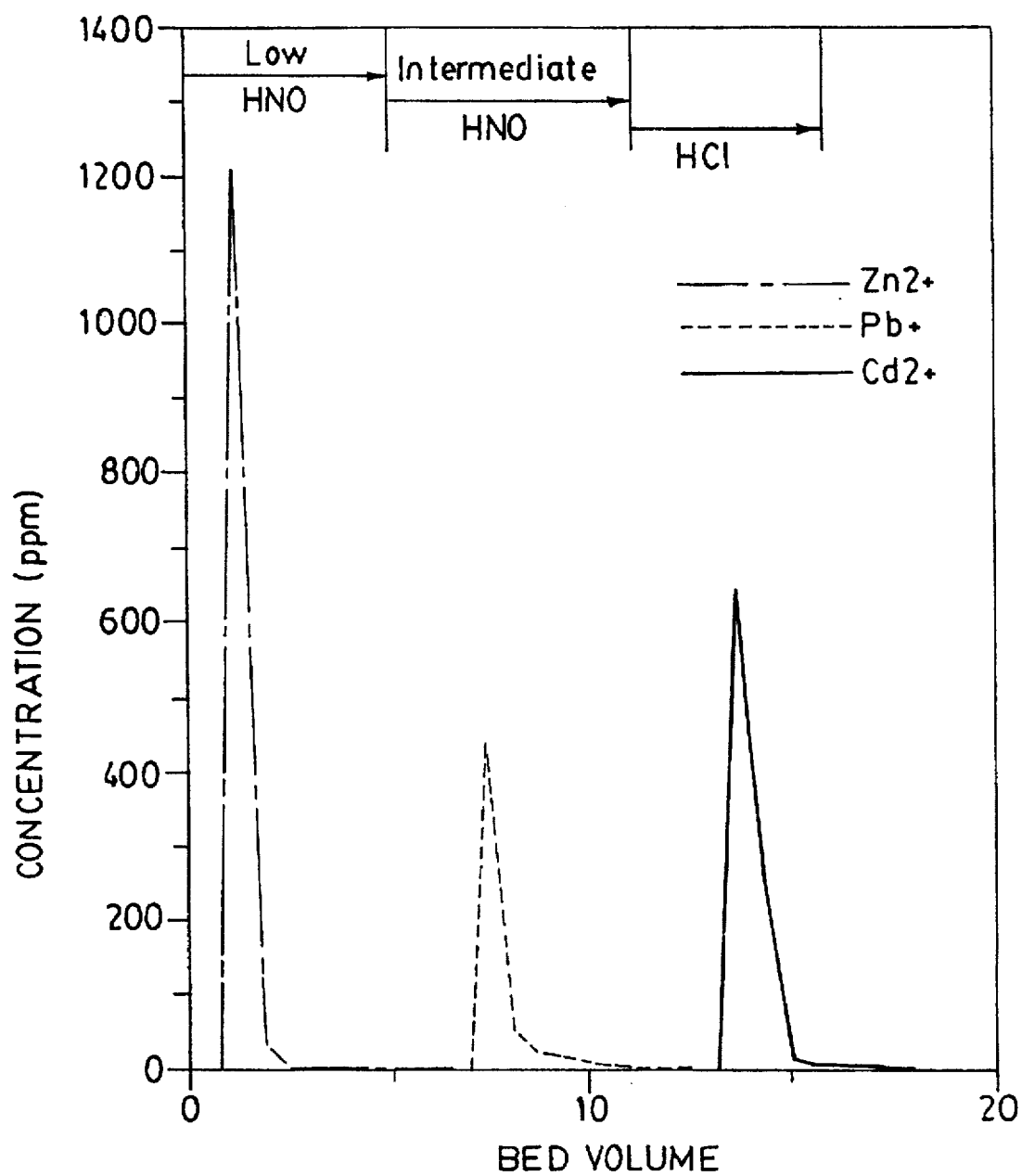
FIG. 6 is a graph of the concentration of zinc, lead and cadmium ions in the effluent stripping solutions versus the bed volumes of stripping solution passed through a column of a composition prepared according to the present invention.

The procedures described in Example 8 were repeated to remove simultaneously zinc, lead and cadmium ions from an aqueous stream. In the present example, however, the bed was regenerated by removing the adsorbed ions from the bed. It was unexpectedly discovered that the metal ions could be selectively desorbed from the bed. The column was first treated with 0.05M nitric acid which removed only zinc. The lead and cadmium ions remained in the column. 0.5M nitric acid removed only lead. Cadmium remained adsorbed to the inventive compositions. The cadmium was finally removed by washing the column with 2.0M hydrochloric acid. The results of the regeneration procedure are illustrated in FIG. 6, a graph of the concentration of zinc, lead and cadmium ions in the effluent stripping solutions versus the bed volumes of stripping solution passed through a column of a composition prepared according to the present invention. Accordingly, it has been unexpectedly discovered that it is possible to selectively strip individual metal ions from the inventive materials and, therefore, facilitate removal of several different species of metal ions while still retaining the ability to separate out each individual ion for recycling or recovery purposes later.

Although the present invention has been described in detail for the purpose of illustration, it is understood that such detail is solely for that purpose, and variations can be made therein by those skilled in the art without departing from the spirit and scope of the invention as described by the following claims.

What is claimed is:

1. A method of removing heavy metal ions from a liquid stream comprising the step of contacting the stream with a composite material under conditions effective to complex said heavy metal ions on said composite material, said composite material having the formula:

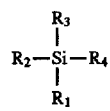

wherein at least one of $R_1$, $R_2$, and $R_3$ is SUPPORT—O— and $R_4$ is

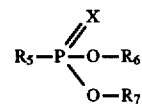

wherein X is S or O; $R_5$ is —$(CH_2)_a$—, where a is an integer from 1 to 5; or

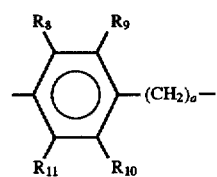

wherein $R_8$–$R_{11}$ are the same or different and are —H or —$(CH_2)_b CH_3$ where b is an integer from 0 to 20; or —$(CH_2)_c$—NH—$(CH_2)_d$—

-continued or

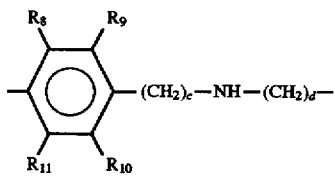

wherein c and d are integers from 1 to 5 and c+d are no greater than 6;

$R_6$ and $R_7$ can be the same or different and are —H or —$(CH_2)_b CH_3$; and remaining of $R_1$, $R_2$ and $R_3$ are

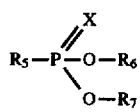

or an alkyl group having 1 to 5 carbon atoms; or

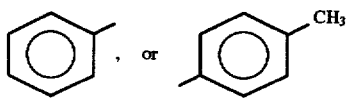

2. A method according to claim 1, wherein said composite material wherein only one of $R_1$, $R_2$ and $R_3$ are SUPPORT—O—.

3. A method according to claim 2, wherein $R_5$ is —$(CH_2)_a$—, $R_6$ and $R_7$ are —H and X is O.

4. A method according to claim 1, wherein $R_2$ is SUPPORT—O—, $R_1$ and $R_3$ are —$CH_3$, $R_5$ is —$CH_2$—, $R_6$ and $R_7$ are —H, and X is O.

5. A method according to claim 4 further comprising:
adjusting the pH of said stream to a value above 3.0, wherein said adjusting is prior to contacting said waste stream with said composite material.

6. A method according to claim 4, further comprising removing complexed metal ions from said composite material to regenerate said composite material.

7. A method according to claim 1, wherein said contacting step comprises flowing said stream through a single packed bed or fluidized bed containing said composite material for removal of a selected metal ion or metal ions from stream containing multiple metal ions.

8. A method according to claim 7 wherein the selected metal ion or metal ions present in the stream are La(III), Nd(III), U(IV), U(VI), Th(IV), Sr(II) or Zn(II) alone or in combination.

9. A method according to claim 4, wherein said contacting step comprises flowing said stream through a first packed bed containing said composite material and then through a second packed bed containing said composite material, wherein said first packed bed and said second packed bed are arranged in series.

10. A method according to claim 9, wherein said first and said second packed, beds contain different composite materials exhibiting different metal ion removal preferences.

11. A method of removing heavy metal ions from a liquid stream comprising the step of contacting the stream with a composite material under conditions effective to complex said heavy metal ions on said composite material and thereafter breaking said complex to free or recover said metal ion or ions and to regenerate composite material by treating said material with a stripping solution, said composite material having the formula:

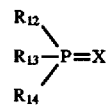

wherein X is S or O; at least one of $R_{12}$, $R_{13}$ and $R_{14}$ is

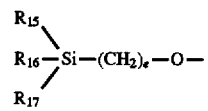

wherein at least one of $R_{15}$, $R_{16}$ and $R_{17}$ is SUPPORT—O— and remaining of $R_{15}$, $R_{16}$ and $R_{17}$ are unsubstituted or lower alkyl or lower aryl substituted saturated hydrocarbon chains having 1 to 20 carbon atoms, and e is an integer from 1 to 5; and remaining of $R_{12}$, $R_{13}$ and $R_{14}$ are —OH, —$(CH_2)_f CH_3$, or —O—$(CH_2)_f CH_3$ wherein f is an integer from 0 to 5.

12. A method according to claim 11, wherein only one of $R_{15}$, $R_{16}$ and $R_{17}$ is SUPPORT—O—.

13. A method according to claim 11, wherein other of $R_{12}$, $R_{13}$ and $R_{14}$ are —O—$(CH_2)_f CH_3$ and X is O.

14. A method according to claim 11, wherein said contacting step comprises flowing said waste stream through a single packed bed or fluidized bed containing said composite material.

15. A method of removing heavy metal ions from a liquid stream comprising the step of contacting the stream with a composite material under conditions effective to complex said heavy metal ions on said composite material and breaking said complex to free or recover said metal ion or ions in the stripping solution to regenerate composite material, said composite material having the formula:

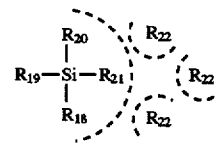

wherein at least one of $R_{18}$, $R_{19}$ and $R_{20}$ is SUPPORT—O— and $R_{21}$ is unsubstituted or lower alkyl substituted or lower aryl substituted hydrocarbon chain having 1 to 20 carbon atoms, or

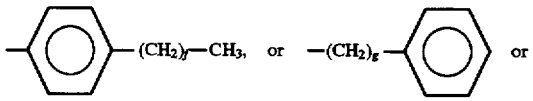

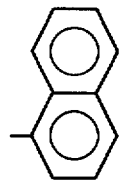

wherein f is an integer from 0 to 20 and g is an integer from 1 to 10; and other of $R_{18}$, $R_{19}$ and $R_{20}$ are $R_{21}$; and $R_{22}$ is a ligand having the formula

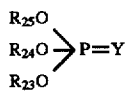

wherein Y is O and only one of $R_{23}$, $R_{24}$, and $R_{25}$ is —H and other of $R_{23}$, $R_{24}$ and $R_{25}$ are unsubstituted or lower alkyl substituted hydrocarbon chains having 5 to 25 carbon atoms or all of $R_{23}$, $R_{24}$ and $R_{25}$ are unsubstituted or lower alkyl substituted hydrocarbon chain having 5 to 25 carbon atoms, or

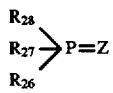

wherein Z is O or S and $R_{26}$–$R_{28}$ are hydrocarbon chains having 5 to 25 carbon atoms, or

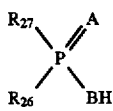

wherein A and B are same or different and are O or S, and wherein $R_{22}$ is adsorbed on $R_{21}$.

16. A method according to claim 15, wherein only one of $R_{18}$, $R_{19}$ and $R_{20}$ are SUPPORT—O—.

17. A method according to claim 16, wherein $R_{25}$ is —H and $R_{23}$ and $R_{24}$ are unsubstituted or lower alkyl substituted hydrocarbon chain having 5 to 25 carbon atoms.

18. A method according to claim 15, wherein $R_{18}$ and $R_{19}$ are SUPPORT—O—, $R_{20}$, and $R_{21}$ are —CH$_3$, $R_{25}$ is —H and $R_{23}$ and $R_{24}$ are

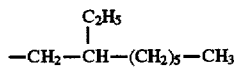

19. A method according to claim 18, further comprising adjusting the pH of said stream to a value above about 3.5, wherein said adjusting is prior to contacting said stream with said composite material.

20. A method according to claim 18, wherein said contacting step comprises flowing said stream through a single packed bed or fluidized bed containing said composite material for removal of a selected metal ion or metal ions from said stream.

21. A method according to claim 15, wherein said contacting step comprises flowing said stream through a first packed bed or fluidized bed containing said composite material and then through a second packed bed or fluidized bed containing said composite material, wherein said first bed and said second bed are arranged in series.

22. A method according to claim 21, wherein said first and said second bed contain different composite materials exhibiting different metal ion removal preferences.

23. A method according to claim 21, wherein the pH of said waste stream is adjusted after leaving said first bed and before entering said second packed bed.

24. A method according to claim 20, wherein the selected metal ion or metal ions present in the stream are Pb(II), Cd(II), Sb(V), V(V), Th(IV), Sc(III), Mo(VI), Y(III), Zr(IV), Nd(III) or La(III) alone or in combination.

25. A method according to claim 16, wherein A and B are both O, and $R_{26}$ and $R_{27}$ are unsubstituted or lower alkyl substituted hydrocarbon chains having 5-25 carbon atoms.

26. A method according to claim 15, wherein $R_{18}$ and $R_{19}$ are SUPPORT—O—, $R_{20}$ and $R_{21}$ are —CH$_3$, A and B are both O, and $R_{26}$ and $R_{27}$ are

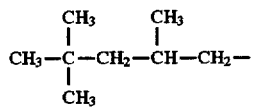

27. A method according to claim 26, further comprising adjusting the pH of said stream to a value above about 5.0 wherein said adjusting is prior to contacting said stream with said composite material.

28. A method according to claim 26, wherein said contacting step comprises flowing said stream through a single packed bed or fluidized bed containing said composite material for removal of a selected metal ion or metal ions from said stream.

29. A method according to claim 28, wherein the selected metal ion or metal ions present in the stream are Pb(II), Cd(II), Co(II), Zn(II), Cu(II), Ni(II), Mn(II), Al(III), U(IV), U(VI), Th(IV), Nd(III), or La(III) alone or in combination.

30. A method according to claim 16, wherein A is S, B is O, and $R_{26}$ and $R_{27}$ are unsubstituted or lower alkyl substituted hydrocarbon chains having 5–25 carbon atoms.

31. A method according to claim 15, wherein $R_{18}$ and $R_{19}$ are SUPPORT—O—, $R_{20}$ and $R_{21}$ are —CH$_3$, A is S, B is O, and $R_{26}$ and $R_{27}$ are

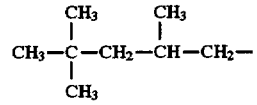

32. A method according to claim 31, further comprising adjusting the pH of said stream to a value above about 2.0 wherein said adjusting is prior to contacting said stream with said composite material.

33. A method according to claim 31, further comprising:
selectively removing complexed metal ions from said composite material with different stripping solutions to separate individual metal ions.

34. A method according to claim 33, wherein complexed zinc, lead and cadmium are removed selectively from said composite material with 0.05M nitric acid, 0.5M nitric acid and 2.0M hydrochloric acid stripping solutions respectively.

35. A method according to claim 31, wherein said contacting step comprises flowing said stream through a single packed bed or fluidized bed containing said composite material for removal of a selected metal ion or metal ions from said stream.

36. A method according to claim 35, wherein the selected metal ion or metal ions present in the stream are Pb(II), Cd(II), Zn(II), Cu(II), Co(II), Mn(II), Ag(I), Au(III), Hg(I) or Pd(II) alone or in combination.

* * * * *